United States Patent [19]

Gomez et al.

[11] Patent Number: 4,974,426
[45] Date of Patent: Dec. 4, 1990

[54] COOLER

[76] Inventors: Sergio G. Gomez, 9710 SW. 103 Ave., Miami, Fla. 33176; Sergio J. Gomez, 5185 Alton Rd., Miami Beach, Fla. 33140

[21] Appl. No.: 367,920
[22] Filed: Jun. 19, 1989
[51] Int. Cl.[5] .............................................. F25D 3/08
[52] U.S. Cl. .................................... 62/457.7; 62/461; 62/464
[58] Field of Search ............... 62/457.7, 457.5, 457.4, 62/461, 460, 457.1, 463, 464; 220/20, DIG. 9

[56] References Cited

U.S. PATENT DOCUMENTS

| | | | |
|---|---|---|---|
| 1,464,641 | 8/1923 | Breen | 62/461 X |
| 3,255,607 | 6/1966 | Bair et al. | 62/457.7 X |
| 4,286,440 | 9/1981 | Taylor | 62/457.7 |
| 4,510,770 | 4/1985 | Vella | 62/464 |
| 4,655,052 | 4/1987 | Garcia | 62/457.7 X |
| 4,704,875 | 11/1987 | Kieler | 62/372 |

Primary Examiner—Lloyd L. King
Attorney, Agent, or Firm—J. Sanchelima

[57] ABSTRACT

A cooler for storing ice, water and food stuff defining an insulated compartment. Several beverage container holders are disposed around the housing and include connecting openings that allow the cold water in. These holders extend below the plane of the bottom wall in order to maximize the level of the water contained in the holder and thereby increasing the heat exchange area with the container. At least one container dispensing assembly is provided for stacking up the containers adjacent to the peripheral wall and allowing the containers to roll over the bottom wall and outwardly through an aperture on the lower end of the wall. The bottom wall includes a depression in the area below the aperture to cause the water to accumulate thereon and increase the heat exchange area with the container as it passes through. A convexity on the internal surface of the bottom wall prevents any water from collecting thereon.

13 Claims, 4 Drawing Sheets

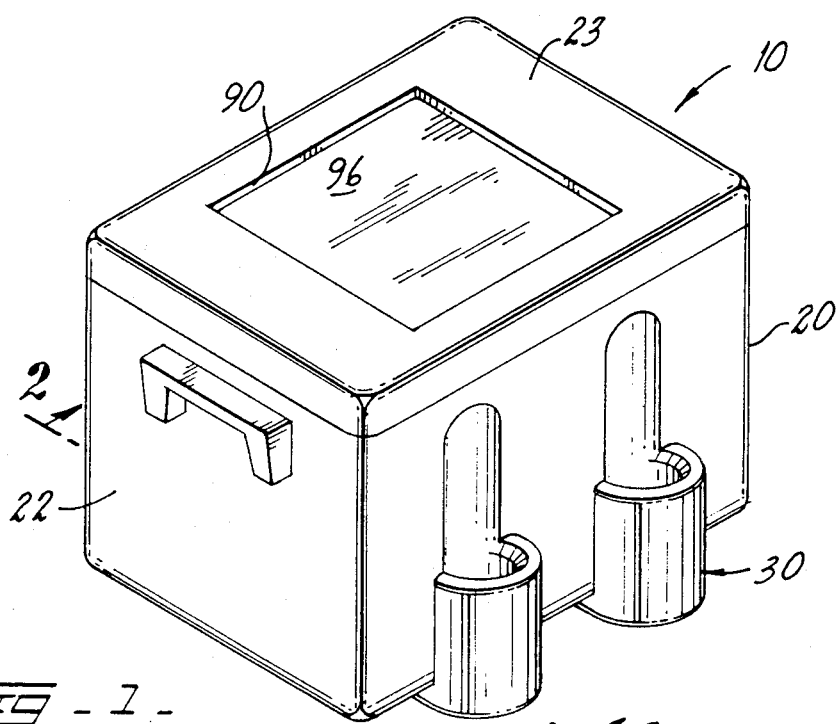
FIG-1-
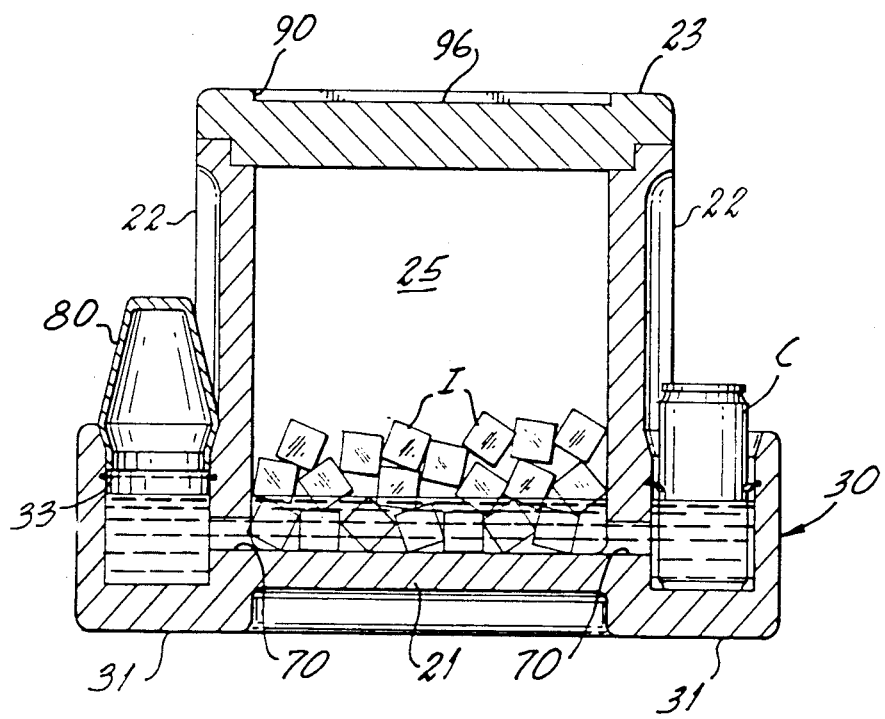
FIG-2-

COOLER

BACKGROUND OF THE INVENTION

1. Field of the Invention

The present invention relates to coolers, and more particularly, to those coolers that maintain the beverages in containers cold.

2. Description of the Related Art

Applicant believes that the closest reference corresponds to the U.S. Pat. No. 4,704,875 issued to Kieler. However, it differs from the present invention because it actually teaches away from the invention by taking steps to prevent any contact between the containers and the water produced by the melting ice. See lines 24–26 of column 1.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a cooler that allows a user to position the beverages containers within easy reach while maintaining a low temperature.

It is another object of this present invention to provide a cooler that includes a board game on its cover.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts of will be more fully understood form the following description, when read in conjunction with the accompanying drawings in which:

FIG. 1 represents a view in perspective of a cooler in accordance with the teachings of the present invention.

FIG. 2 shows a cross-sectional view of the cooler represented in FIG. 1.

DETAILED DESCRIPTION OF THE PREFERRED EMBODIMENT

Figure 3:
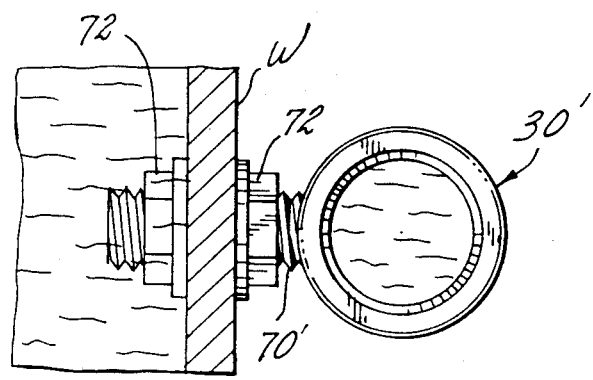
FIG. 3 illustrates a top view of an alternate embodiment of the beverage container holder mounted to the peripheral wall of a cooler.

Referring now to FIGS. 1 and 2, where the present invention is generally referred to with numeral 10, it can be observed that it basically includes a housing 20 that defines an insulated compartment 25 with bottom wall 21, lateral walls 22 and cover 23. All of these walls are constructed with an insulating material, preferably, a moldable material for production in quantities. Several beverage container holders 30 are preferably molded on the outer surface of lateral wall 22, as shown in FIG. 2. They are preferably of cylindrical shape and of sufficiently large dimensions to cooperatively receive popular beverage containers C. Sealing rings 33 are positioned on the inner surface of holders 30 keeping containers C in place and wiping out excess water as container C is retrieved. Connecting openings 70 are provided at locations substantially at the bottom of walls 22 and connecting holders 30 so that the cold water from the melting ice I can penetrate container holders 30 and keep the beverages cold. Holders 30 extend downwardly beyond bottom wall 21 with the dual function of providing a resting area for cooler 10 and also to have a lower level that allows more cold water. The latter function permits a greater heat transfer area between container C and the cold water. Cap members 80 prevent the heat from entering, prevent extraneous matter from coming in and it may be used as a drinking glass or cup.

Figure 4:
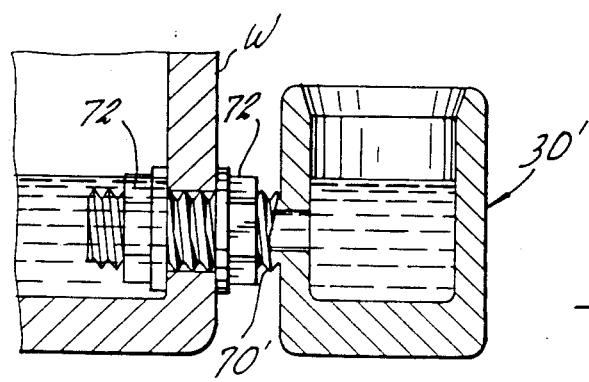
FIG. 4 shows a cross-sectional side view of the holder represented in FIG. 3.

An alternate embodiment for the beverage container holders is illustrated in FIGS. 3 and 4 generally with reference numeral 30' and it is intended to be used in existing conventional coolers by perforating its wall W with threaded tubular member 70' and locked in place with locking hardware 72.

Figure 5:
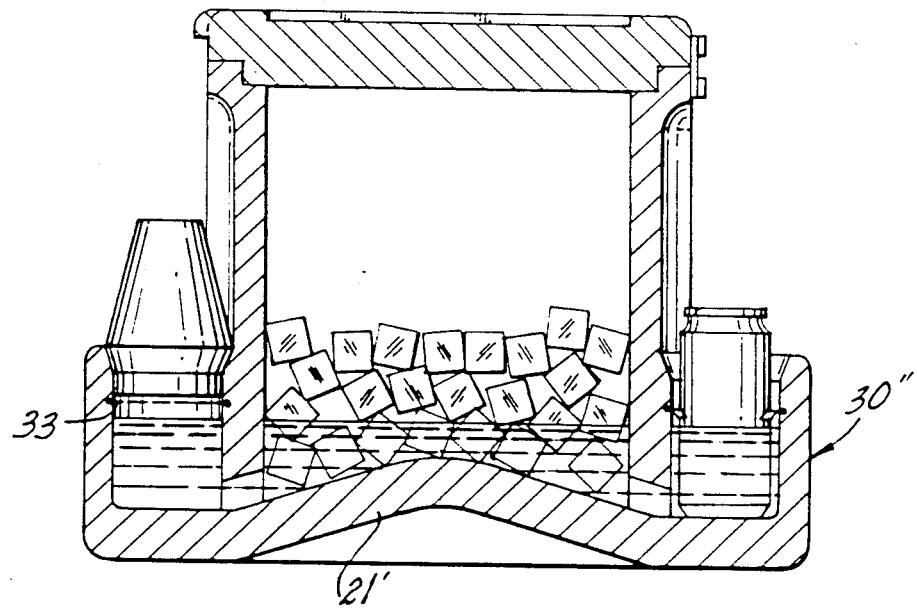
FIG. 5 is another alternate embodiment for the present invention showing a convexity on the internal surface of the bottom wall.

In FIG. 5 another embodiment is shown having a convex bottom wall 21' that prevents the accumulation of water and causes it to be displaced towards holders 30''.

Figure 6:
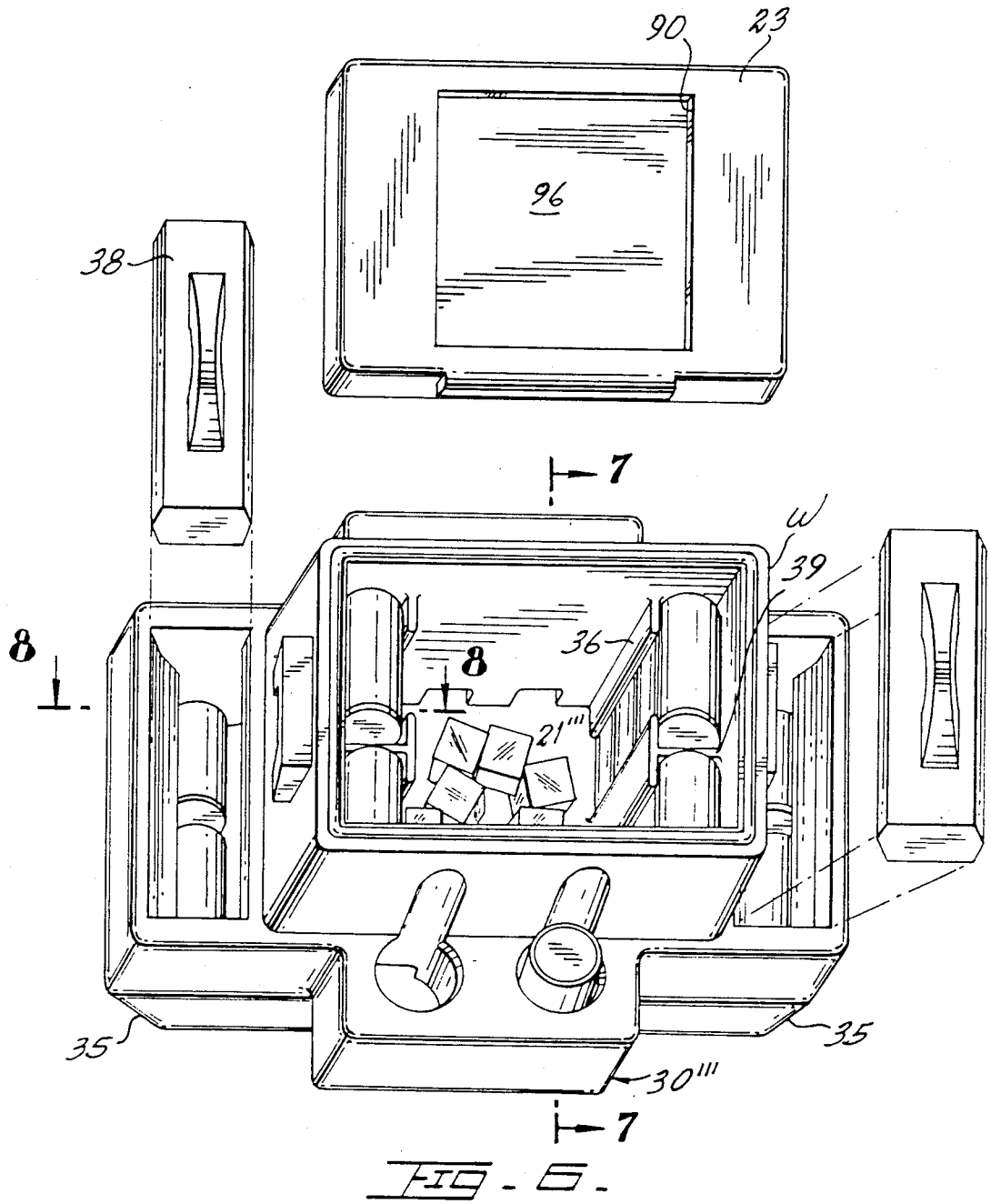
FIG. 6 is an exploded view in the perspective showing the interior of still another embodiment of the cooler subject of the present application and including the beverage container assembly.
Figure 7:
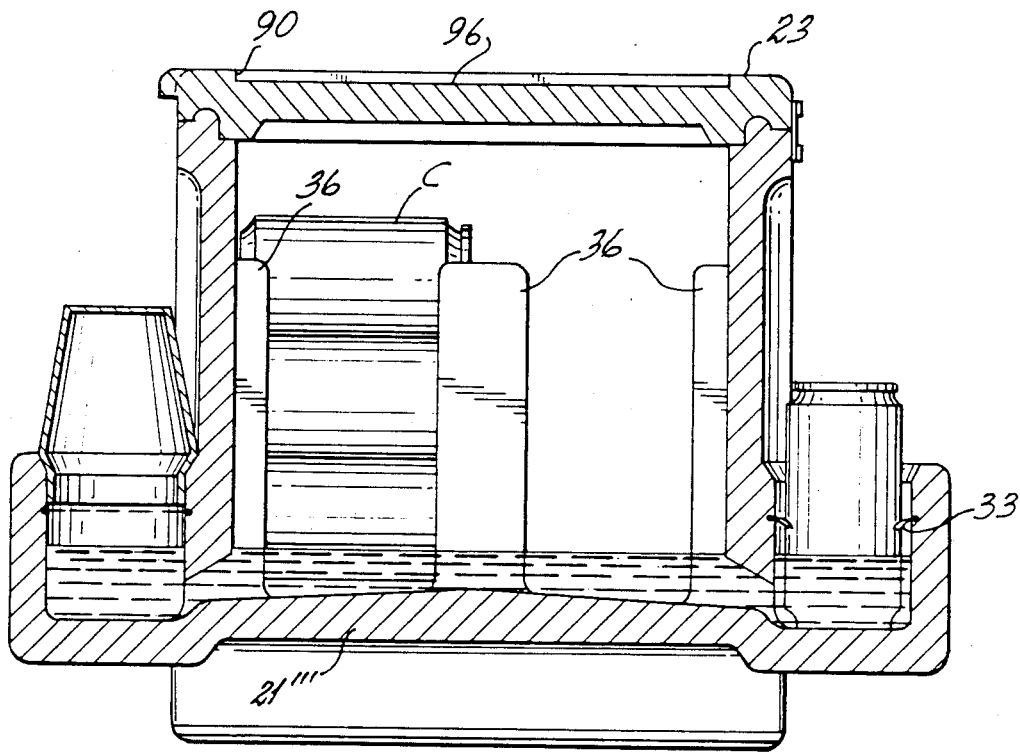
FIG. 7 shows a cross-sectional view taken along line 7—7 in FIG. 6.
Figure 8:
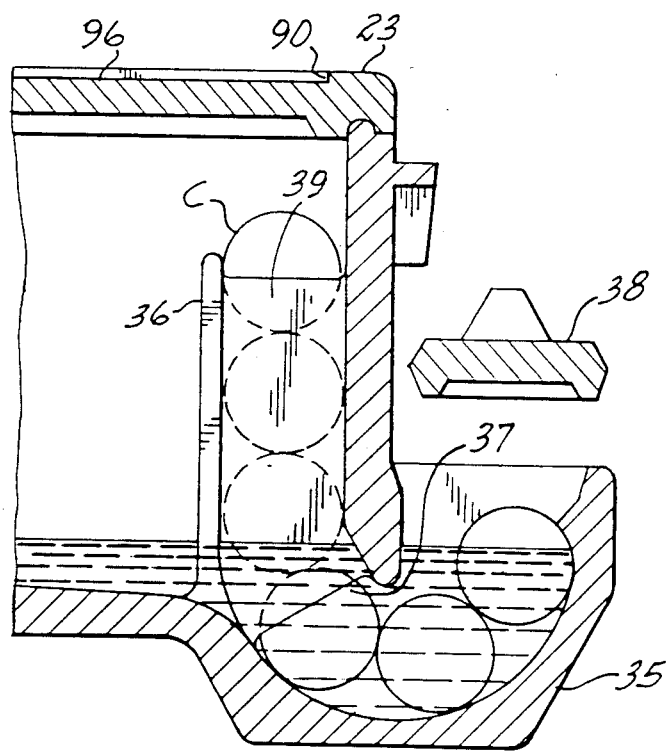
FIG. 8 is a partial cross-sectional view of the beverage container dispensing assembly and is associated cap member.

In FIG. 6 still another embodiment of the present invention is illustrated where beverage container holder 30''' are shown on two sides or cooler 10 and the other two sides have beverage container dispensers 35. Dispensers 35 include internal guide members 36 that are rigidly and upwardly mounted to the internal surface of bottom wall 21''' and cooperatively coacts with closet internal surface of wall W to hold a stack of beverage containers C as shown in FIGS. 7 and 8. Dispenser 35 extends downwardly and also acts as supporting leg for cooler 10. An aperture 37 allows containers C and the water through, maintaining container C at a low temperature until it is removed. Separating member 39 permits the formation of two stacks of containers C in the preferred embodiment. A cap member 38 is used to keep the water thermically insulated from the outside and to prevent any extraneous matter from coming inside the cooler's compartment.

Support legs 31 are preferably integrally built in extensions of containers 30 and allow the ice water to come in contact with a larger area of container C inside holders 30.

Cover member 23 includes a recessed area 90 where removable game board 96 is positioned. The design of different board games can be incorporated on both faces of board 96.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A cooler for holding and storing ice, water, beverage containers and food stuff, comprising:
   A. a housing defining a compartment having a bottom wall peripherally joined by perpendicularly extending lateral wall wherein said lateral wall includes a plurality of connecting openings;
   B. a plurality of beverage containers holding means positioned in cooperation with said connecting openings so that said water is received within said holders thereby bringing said water in contact with said containers: and said plurality of beverage container holding means and integrally built in said cooler and wherein said plurality of beverage container holding means extend downwardly beyond the plane of the said bottom wall thereby serving as support legs for said cooler and;
   C. means for covering said housing having an outer surface.

2. The cooler set forth in claim 1 wherein said means for covering said housing includes a recessed game board on its outer surface.

3. The cooler set forth in claim 2 wherein said plurality of beverage container holding means include a corresponding plurality of removably mounted cap members having a cooperating shape to be used also as a drinking cup.

4. The cooler set forth in claim 3 wherein said bottom wall has a convexity that prevents said water from accumulating thereon.

5. The cooler set forth in claim 4 wherein said container holding means includes sealing means for keeping containers in place and also for wiping out the excess water in contact with said containers.

6. The cooler set forth in claim 1 wherein said plurality of container holding means include a plurality of tubular means connecting said container holding means to the interior of said cooler by passing through said connecting openings.

7. The cooler set forth in claim 5 wherein said tubular means includes a threaded outer surface and further includes fastening means to keep said tubular means rigidly mounted to said cooler.

8. The cooler set forth in claim 5 wherein said bottom wall has a convexity on its internal surface that prevents said water from accumulating thereon.

9. The cooler set forth in claim 8 wherein said container holding means includes sealing means for keeping said containers in place and also for wiping out the excess water in contact with said containers.

10. The cooler set forth in claim 1 further including:
    C. means for dispensing said containers integrally mounted on the outer surface of said lateral wall and said lateral wall further including an aperture of sufficient dimensions to allow said containers to drop down along said lateral wall and over said bottom wall thereby coming in contact with said water stored in the bottom of said cooler.

11. The cooler set forth in claim 10 wherein said means for dispensing said containers includes guiding means for stacking said containers above said aperture and said guiding means being parallel and spaced apart from he area on said peripheral wall that is above said aperture.

12. The cooler set forth in claim 11 wherein said bottom wall includes a convexity that prevents said water from accumulating thereon.

13. The cooler set forth in claim 1 wherein said container holding means includes sealing means for keeping said containers in place and also for wiping out the excess water in contact with said containers.

* * * * *